US011601561B2

(12) United States Patent
Hirokawa

(10) Patent No.: US 11,601,561 B2
(45) Date of Patent: Mar. 7, 2023

(54) IMAGE FORMING APPARATUS, METHOD OF CONTROLLING DISPLAY, AND RECORDING MEDIUM

(71) Applicant: Tatsuma Hirokawa, Kanagawa (JP)

(72) Inventor: Tatsuma Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/969,436

(22) PCT Filed: Dec. 20, 2018

(86) PCT No.: PCT/JP2018/047032
§ 371 (c)(1),
(2) Date: Aug. 12, 2020

(87) PCT Pub. No.: WO2019/176217
PCT Pub. Date: Sep. 19, 2019

(65) Prior Publication Data
US 2021/0006678 A1    Jan. 7, 2021

(30) Foreign Application Priority Data

Mar. 16, 2018    (JP) .............................. JP2018-049977

(51) Int. Cl.
*H04N 1/00*    (2006.01)
(52) U.S. Cl.
CPC ..... *H04N 1/00501* (2013.01); *H04N 1/00411* (2013.01); *H04N 1/00424* (2013.01); *H04N 1/00474* (2013.01)
(58) Field of Classification Search
None
See application file for complete search history.

(56) References Cited

U.S. PATENT DOCUMENTS 8,307,304 B2 * 11/2012 Takahashi ............... G06F 9/451
715/826
8,531,686 B2 * 9/2013 Umezawa .......... H04N 1/32561
358/1.13

(Continued)

FOREIGN PATENT DOCUMENTS

CN    102164213 A    8/2011
CN    102348030 A    2/2012

(Continued)

OTHER PUBLICATIONS

International Search Report dated Mar. 12, 2019 in PCT/JP2018/047032 filed on Dec. 20, 2018.

(Continued)

*Primary Examiner* — Henok Shiferaw
(74) *Attorney, Agent, or Firm* — Harness, Dickey & Pierce, P.L.C.

(57) ABSTRACT

An image forming apparatus installed with at least one first application includes a setting receiving unit, a storage unit, an installation unit, and an addition unit. The setting receiving unit displays at least one first setting screen for setting the first application and receives an input of setting value corresponding to the first application. The storage unit stores first information used, by the setting receiving unit, to display the first setting screen for setting the first application. The installation unit installs a second application on the image forming apparatus. The addition unit adds, to the storage unit, second information used for displaying at least one second setting screen for setting the second application. The setting receiving unit displays the second setting screen based on the second information added to the storage unit and to receive an input of setting value of the second application.

15 Claims, 16 Drawing Sheets

(56) References Cited

U.S. PATENT DOCUMENTS

| | | | |
|---|---|---|---|
| 8,656,287 B2* | 2/2014 | Mori | G06F 9/451 |
| | | | 715/761 |
| 9,648,200 B2* | 5/2017 | Mori | H04N 1/32379 |
| 10,348,926 B2* | 7/2019 | Hayashi | H04N 1/00244 |
| 10,708,461 B2* | 7/2020 | Ogawa | G06F 8/38 |
| 2007/0296992 A1* | 12/2007 | Tanaka | G06F 3/1271 |
| | | | 358/1.13 |
| 2008/0134179 A1* | 6/2008 | Takahashi | H04N 1/00344 |
| | | | 718/100 |
| 2009/0228835 A1 | 9/2009 | Takahashi | |
| 2011/0164269 A1 | 7/2011 | Kamishiro | |
| 2011/0276960 A1 | 11/2011 | Nakamoto | |
| 2013/0128313 A1 | 5/2013 | Hirokawa et al. | |
| 2017/0242572 A1 | 8/2017 | Inoue | |
| 2017/0331969 A1 | 11/2017 | Ogawa et al. | |
| 2018/0068345 A1 | 3/2018 | Hirokawa et al. | |

FOREIGN PATENT DOCUMENTS

| | | |
|---|---|---|
| EP | 2345976 A1 | 7/2011 |
| JP | 2008-167417 A | 7/2008 |
| JP | 2009-238207 A | 10/2009 |
| JP | 2010-015533 A | 1/2010 |
| JP | 2010-079348 A | 4/2010 |
| JP | 2017-092765 A | 5/2017 |
| JP | 2017-144649 A | 8/2017 |

OTHER PUBLICATIONS

Written Opinion dated Mar. 26, 2019 in PCT/JP2018/047032 filed on Dec. 20, 2018.
Japanese Office Action dated Dec. 7, 2021, issued in corresponding Japanese Patent Application No. 2018-049977.
First Office Action dated Jul. 13, 2022 in Chinese Patent Application No. 201880091324.7.

* cited by examiner

FIG. 3

| Setting Owner | ID | Setting Type | Input Range | Title | Setting Value | Location | |
|---|---|---|---|---|---|---|---|
| Application A | A001 | Numeric | 0 – 10 | The Number of Retries | 3 | Other Settings>Application A settings | ... |
| Application A | A002 | Numeric | 10 – 1000 | Retry Interval | 100 | Other Settings>Application A settings | ... |
| Application B | B001 | Character String | 0 – 100 characters | Notice from Administrator | "The device is unavailable every Sunday" | System Settings>Administrator Settings | ... |
| Application B | B002 | Select-One | ON, OFF | Device Power Saving Priority Settings | OFF | System Settings>Power Saving Settings | ... |
| Application C | C001 | Select-Plural | copy, scan, print, fax | Priority Function | copy, scan, fax | System Settings>Administrator Settings | ... |
| ... | ... | ... | ... | ... | ... | ... | ... |
| Application E | E001 | Numeric | 10 – 300 | Reset Timer | 60 | Other Settings>Application E settings | ... |
| Application E | E002 | Select-One | full color, monochrome, grayscale | Default Color Mode | full color | Other Settings>Application E settings | ... |
| Application E | E003 | Select-One | ON, OFF | Application E Power Saving Priority Settings | ON | Other Settings>Application E settings System Settings>Power Saving Settings | ... |
| ... | ... | ... | ... | ... | ... | ... | ... |

100

102

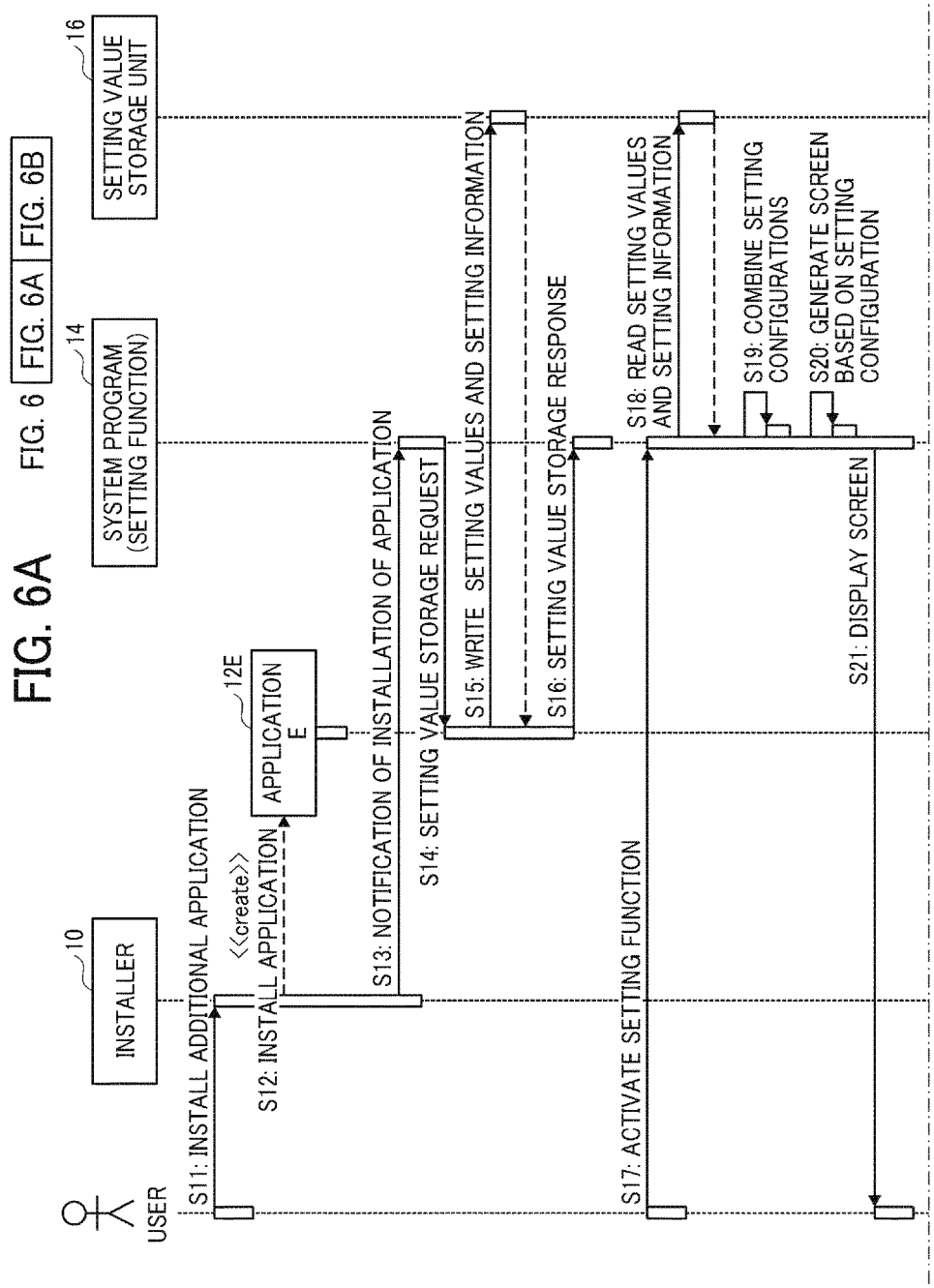

```
{
    "id":"settings",
    "title":"settings",
    "type":"category",
    "children":[                                                    ～210
        {
            "id":"settings:system",
            "title":"system settings",
            "type":"category",
            "children":[                                            ～200
                {
                    "id":"settings:system:eco",
                    "title":"power saving settings",
                    "type":"category",                ～202
                    "children":[
                        {"id":"settings:system:eco:B002"},     ～204
                        {"id":"settings:system:eco:E003"}      ～206
                    ]
                },
                {
                    "id":"settings:system:admin",
                    "title":"administrator settings",
                    "type":"category",
                    "children":[
                        <omission>
                    ]
                }
                <omission>
            ]
        },
        {
            "id":"settings:copy",
            "title":"Copy settings",
            "type":"category",
            "children":[
                <omission>
            ]
        },
        {
            "id":"settings:scan",
            "title":"scan settings",
            "type":"category",
            "children":[
                <omission>
            ]
        },
```

FIG. 9

| ELEMENT TYPE | SETTING TYPE | RENDERING TEMPLATE | |
|---|---|---|---|
| CONFIGU-RATION | – | OTHER SETTINGS | |
| CONTENT | NUMERIC | TITLE | VALUE |
| | CHARACTER STRING | TITLE | VALUE |
| | SELECT-ONE | TITLE | VALUE |
| | ⋮ | ⋮ | |

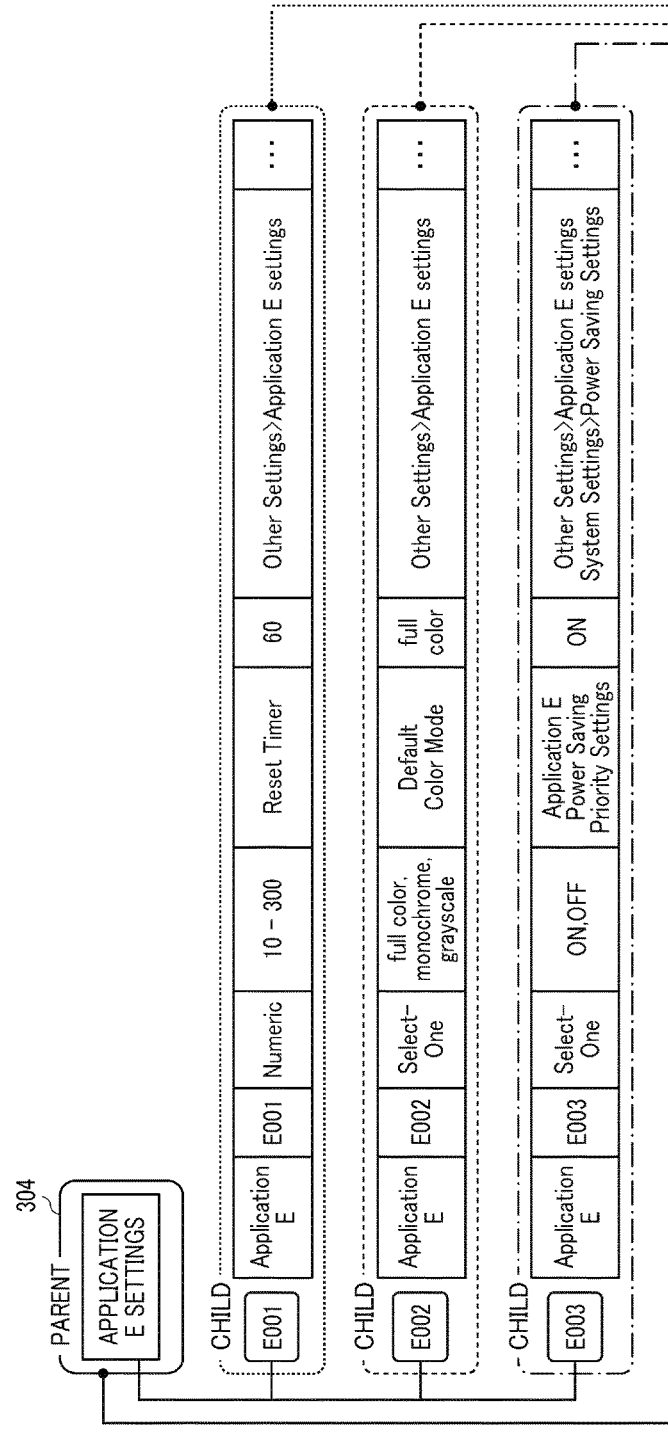
FIG. 11A  FIG. 11 | FIG. 11A | FIG. 11B

IMAGE FORMING APPARATUS, METHOD OF CONTROLLING DISPLAY, AND RECORDING MEDIUM

CROSS-REFERENCE TO RELATED APPLICATIONS

This application is a national phase under 35 U.S.C. § 371 of PCT International Application No. PCT/JP2018/047032 which has an International filing date of Dec. 20, 2018, which claims priority to Japanese Application No. 2018-049977, filed Mar. 16, 2018, the entire contents of each of which are hereby incorporated by reference.

TECHNICAL FIELD

The embodiments of the present disclosure relate to an image forming apparatus, a method of controlling display, and a recording medium.

BACKGROUND ART

In recent years, various functions such as a scanning function and a copying function are installed on the image forming apparatus. In such an image forming apparatus, a system program has been generated to configure a screen for inputting one or more setting values required to execute each of the functions such as the scanning function and the copying function installed on the image forming apparatus in advance. Conventionally, when an additional program, such as an application program, is developed and installed on such an image forming apparatus to add a new function, and a new setting value is required to be input to execute the newly added function, the system program is required to be changed in a manner that the setting value for executing the newly added function can be input. There is a known plug-in program that is dynamically operable in conjunction with a system program and in which information for inputting a setting value required to execute an additional function is described. With this plug-in program, the system program is not required to be changed, even when, for example, an additional program, such as an application program, requiring a new setting value is newly installed.

CITATION LIST

Patent Literature

PTL 1: JP-2017-144649-A

SUMMARY OF INVENTION

Technical Problem

When a conventional image forming apparatus newly installs an additional program such as an application program requiring a new setting value, a plug-in program corresponding to the additional program is required to be developed. In addition, installing the plug-in program on the conventional image forming apparatus is burdensome and takes time.

An object of an embodiment of the disclosure is to provide an image forming apparatus that can easily add settings of an additional application to a setting screen for receiving application settings.

Solution to Problem

In view of the above, the disclosure provides an image forming apparatus including a setting receiving unit, a storage unit, an installation unit, and an addition unit. At least one first application is installed on the image forming apparatus. The setting receiving unit displays at least one first setting screen for setting the first application and receives an input of setting value corresponding to the first application. The storage unit stores first information used, by the setting receiving unit, to display the first setting screen for setting the first application. The installation unit installs a second application on the image forming apparatus. The addition unit adds, to the storage unit, second information used for displaying at least one second setting screen for setting the second application. The setting receiving unit displays the second setting screen based on the second information added to the storage unit and to receive an input of setting value of the second application.

Advantageous Effects of Invention

According to an embodiment of disclosure, it is possible to easily add settings of an additional application to a setting screen for receiving application settings.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 3 is a table illustrating an example of setting values and setting information stored in a setting value storage unit, according to an embodiment of the present disclosure.

FIG. 6A and FIG. 6B (FIG. 6) are a diagram illustrating an example of a process in which an additional application is installed on an image forming apparatus and a setting screen is displayed by a setting function, according to an embodiment of the present disclosure.

FIG. 7A and FIG. 7B (FIG. 7) are a diagram of an example of data describing a setting configuration, according to an embodiment of the present disclosure.

FIG. 9 is an illustration of a rendering template, according to an embodiment of the present disclosure.

FIG. 11A and FIG. 11B (FIG. 11) are a diagram illustrating an example of a screen rendering process, according to an embodiment of the present disclosure.

DESCRIPTION OF EMBODIMENTS

Figure 1:
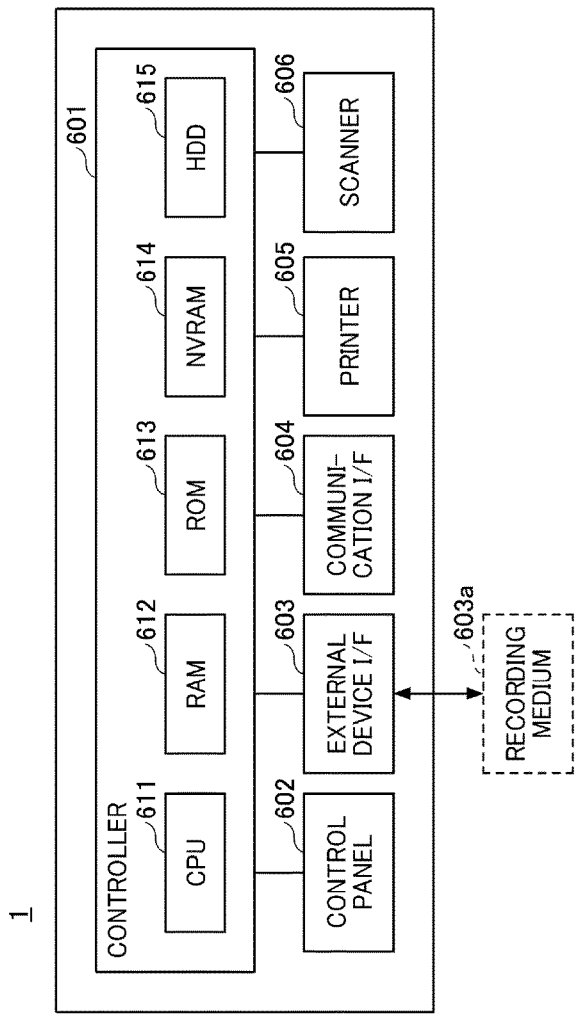
FIG. 1 is a block diagram illustrating an example of a hardware configuration of an image forming apparatus according to an embodiment of the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, wherein like reference numerals designate identical or corresponding parts throughout the several views, embodiments of the present disclosure are described.

First Embodiment

Hardware Configuration
Image Forming Apparatus

An image forming apparatus 1 according to a first embodiment has a hardware configuration as illustrated in FIG. 1. FIG. 1 is a block diagram illustrating an example of a hardware configuration of the image forming apparatus 1 according to the present embodiment. As illustrated in FIG. 1, the image forming apparatus 1 includes a controller 601, a control panel 602, an external device interface (I/F) 603, a communication I/F 604, a printer 605, and a scanner 606.

The controller 601 includes a central processing unit (CPU) 611, a random-access memory (RAM) 612, a read-only memory (ROM) 613, a non-volatile random-access memory (NVRAM) 614, and a hard disk drive (HDD) 615. The ROM 613 stores various programs and data. The RAM 612 temporarily stores programs and data. The NVRAM 614 stores setting information, for example. The HDD 615 stores various programs and data.

The CPU 611 reads programs, data, setting information, and the like from the ROM 613, the NVRAM 614, the HDD 615 and the like, onto the RAM 612 to execute processing for controlling the overall operation of the image forming apparatus 1 or for implementing functions of the image forming apparatus 1.

The control panel 602 includes an input device that receives a user input, and a display device that displays various types of information. The external device I/F 603 is an interface that connects the image forming apparatus 1 to an external device. As an example of the external device, a recording medium 603a is used. The external device I/F 603 enables the image forming apparatus 1 to read or write data from or to the recording medium 603a. Examples of the recording medium 603a include an integrated circuit (IC) card, a flexible disc, a compact disc (CD), a digital versatile disc (DVD), a secure digital (SD) memory card, and a universal serial bus (USB) memory.

The communication I/F 604 is an interface that connects the image forming apparatus 1 to a network. With this configuration, the image forming apparatus 1 transmits or receives (communicates) data via the communication I/F 604. The printer 605 is a printing device that prints print data on a sheet of paper. The scanner 606 is a reading device that scans a document to obtain image data (electronic data).

The hardware configuration illustrated in FIG. 1 is merely an example, and there may be various other configurations, such as a configuration without one of the printer 605 and the scanner 606, a configuration having device implementing a function of performing image forming processing other than the functions implemented by the printer 605 and the scanner 606, and a configuration combining thereof.

Functional Configuration

Figure 2:
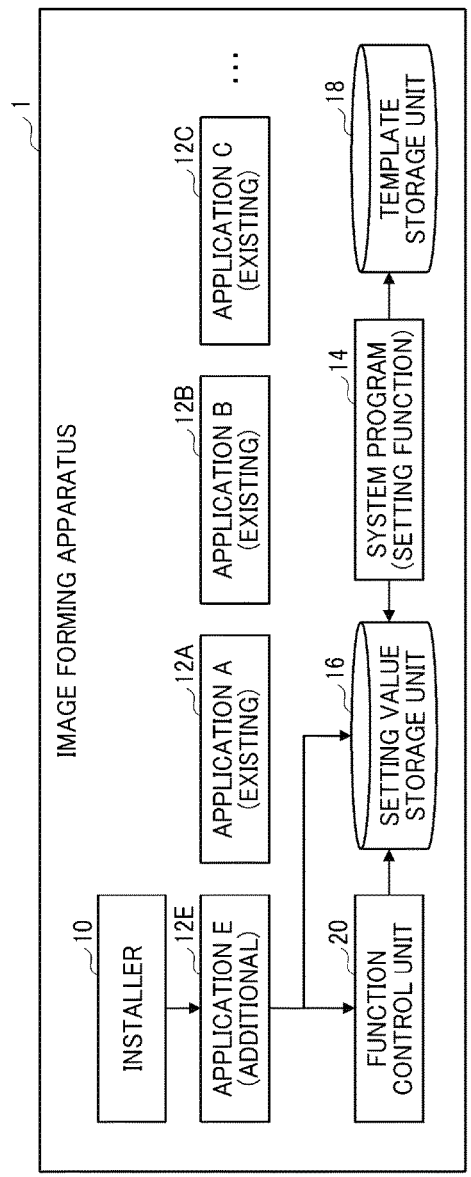
FIG. 2 is a block diagram illustrating an example of a hardware configuration of an image forming apparatus according an embodiment of the present disclosure.

A description is now given of a functional configuration of the image forming apparatus 1 according to the present embodiment. FIG. 2 is a block diagram illustrating an example of a functional configuration of the image forming apparatus 1 according to the present embodiment. The functional configuration of the image forming apparatus 1 may include other functional unit in addition to the functional units illustrated in FIG. 2.

The image forming apparatus 1 illustrated in FIG. 2 includes an installer 10, existing applications (first applications) 12A to 12C, an additional application (second application) 12E, a system program 14 having a setting function, a setting value storage unit 16, a template storage unit 18, and a function control unit 20. The existing applications 12A to 12C and the additional application 12E are collectively or individually referred to as applications 12 or an application 12, when being unnecessary to be distinguished from each other.

The installer 10 is an example of a program for installing an application program on the image forming apparatus 1. The existing applications 12A to 12C are examples of application programs installed on the image forming apparatus 1 in advance.

The additional application 12E is an example of an application program that is additionally installed on the image forming apparatus 1 by the installer 10. In the present embodiment, the additional application 12E writes, in the setting value storage unit 16, setting values and setting information used by the system program 14 to display a setting screen. In addition, the application 12E provides a predetermined function based on the setting values and setting information stored in the setting value storage unit 16.

In addition to the setting values and setting information associated with the additional application 12E written by the additional application 12E, the setting value storage unit 16 stores setting values and setting information associated with each of the existing applications 12A to 12C. The system program 14 is an example of a program that provides a setting function to a user. The system program 14 generates and displays a setting screen based on the setting values and setting information associated with the application 12 stored in the setting value storage unit 16.

The template storage unit 18 stores template information for performing a screen rendering process, which is described later. The template information includes a rendering template illustrated in FIG. 9 and a screen template illustrated in FIG. 10, which are described later. In cooperation with the application 12, the function control unit 20 provides a screen forming function based on the setting values and setting information stored in the setting value storage unit 16.

For example, in response to an instruction to use the copying function from the application 12, the function control unit 20 acquires a sheet from a priority feed tray according to the setting values and setting information and executes copying.

FIG. 3 is a table illustrating an example of the setting values and setting information stored in the setting value storage unit 16. Setting values and setting information 100 illustrated in FIG. 3 indicate a plurality of records each of which includes a setting value and setting information associated with the one of the existing applications 12A to 12C. Setting values and setting information 102 illustrated in FIG. 3 indicate a plurality of records each includes a setting value and setting information associated with the additional application 12E.

Each record of setting value and setting information illustrated in FIG. 3 includes items of setting owner, identification information (ID), setting type, input range, title, setting value, and location. The item of setting owner indicates the application 12 corresponding to each record of setting value and setting information. The item of ID is an example of identification information for identifying each record of setting value and setting information in FIG. 3. The item of setting type indicates a type of setting value, such as a numeric type, a character string type, or a select-one type.

The item of input range indicates a range of setting value. The item of title indicates a title for identifying a corresponding setting value on the setting screen, for a user. The item of setting value indicates a setting value set in a record of setting value and setting information, and the setting value is to be displayed on the setting screen. The item of location indicates an arrangement related to a corresponding record of setting value and setting information in a setting configuration, which is described later.

For example, a location of "Other Settings>Application E Settings" corresponding to an ID of "E001" illustrated in FIG. 3 indicates a piece of content information of "E001" of a piece of configuration information of "Application E Settings" on the setting configuration. A location corresponding to the ID of "E003" illustrated in FIG. 3 indicates a piece of content information of "E003" of the piece of configuration information of "Application E Settings" and a piece of configuration information of "Power Saving Settings" in the setting configuration. As described above, it is also possible to locate a single piece of content information related to a single record of setting value and setting information at plural locations.

Figure 4:
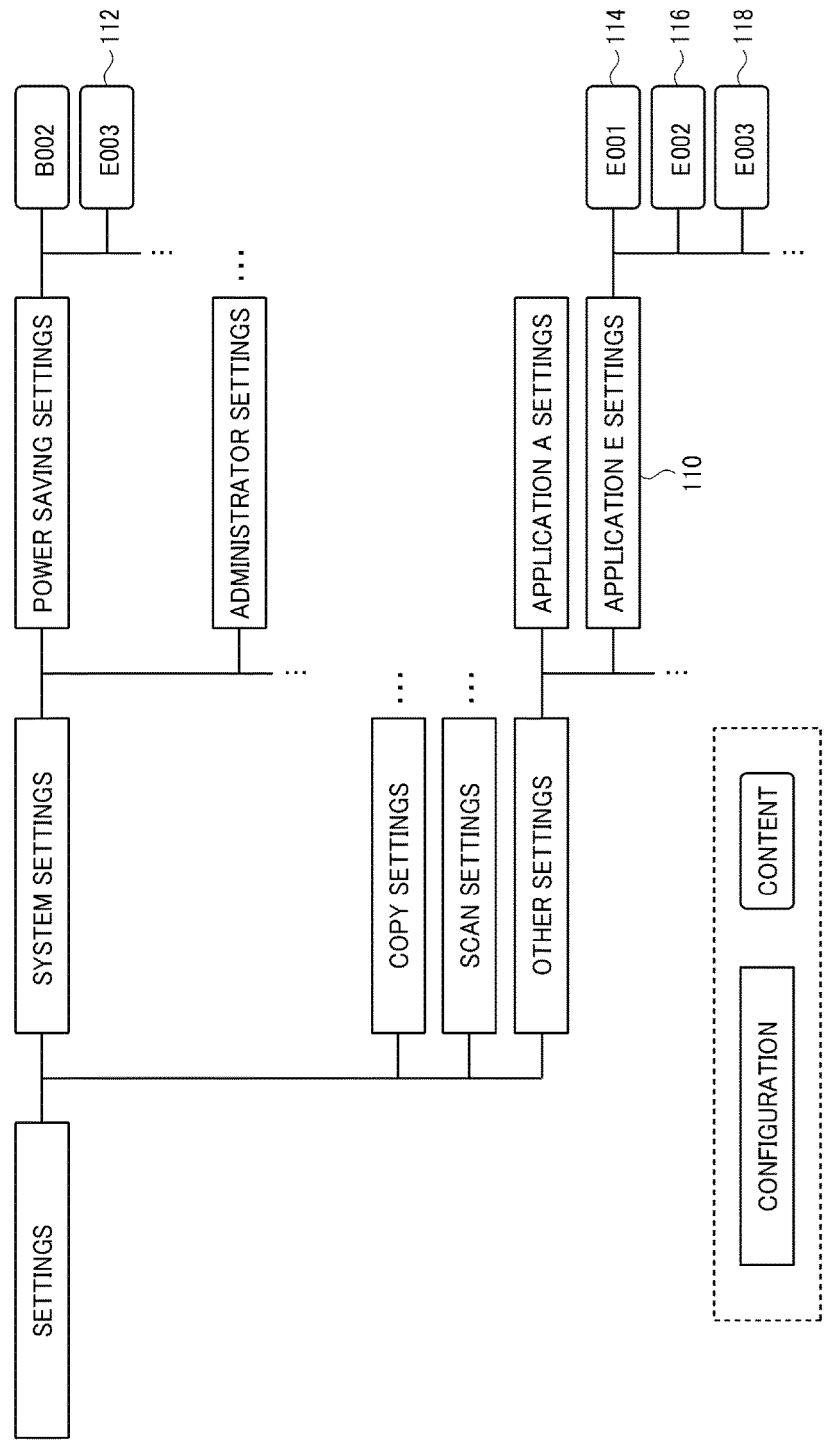
FIG. 4 is a diagram illustrating an example of a setting configuration of a system program, according to an embodiment of the present disclosure.

The system program 14 has a setting configuration as illustrated in FIG. 4. FIG. 4 is a diagram illustrating an example of the setting configuration of the system program 14. As illustrated in FIG. 4, the setting configuration including pieces of configuration information and pieces of content information is represented as a tree structure. Hereinafter, a piece of configuration information is simply referred to as a configuration, and a piece of content information is simply referred to as content or a piece of content. The setting configuration illustrated in FIG. 4 corresponds to the setting values and setting information illustrated in FIG. 3. In FIG. 4, a piece of content 112 is content arranged according to a record of setting value and setting information corresponding the ID of "E003" illustrated in FIG. 3. In FIG. 4, a configuration 110 and pieces of content 114, 116, and 118 are a configuration and content arranged according to the corresponding records of setting values and setting information corresponding to the IDs of "E001", "E002" and "E003" illustrated in FIG. 3.

The system program 14 may store, in advance, a setting configuration of each of the existing applications 12A to 12C, as a basic setting configuration, and when the setting function is activated, an additional setting configuration corresponding to the setting values and setting information 102 illustrated in FIG. 3 (the configuration 110 and the pieces of content 112, 114, 116, and 118) is combined with the basic setting configuration. For example, the system program 14 stores, as data, a setting configuration written in a data description language such as JavaScript Object Notation (JSON) as illustrated in FIG. 4.

Figure 5:
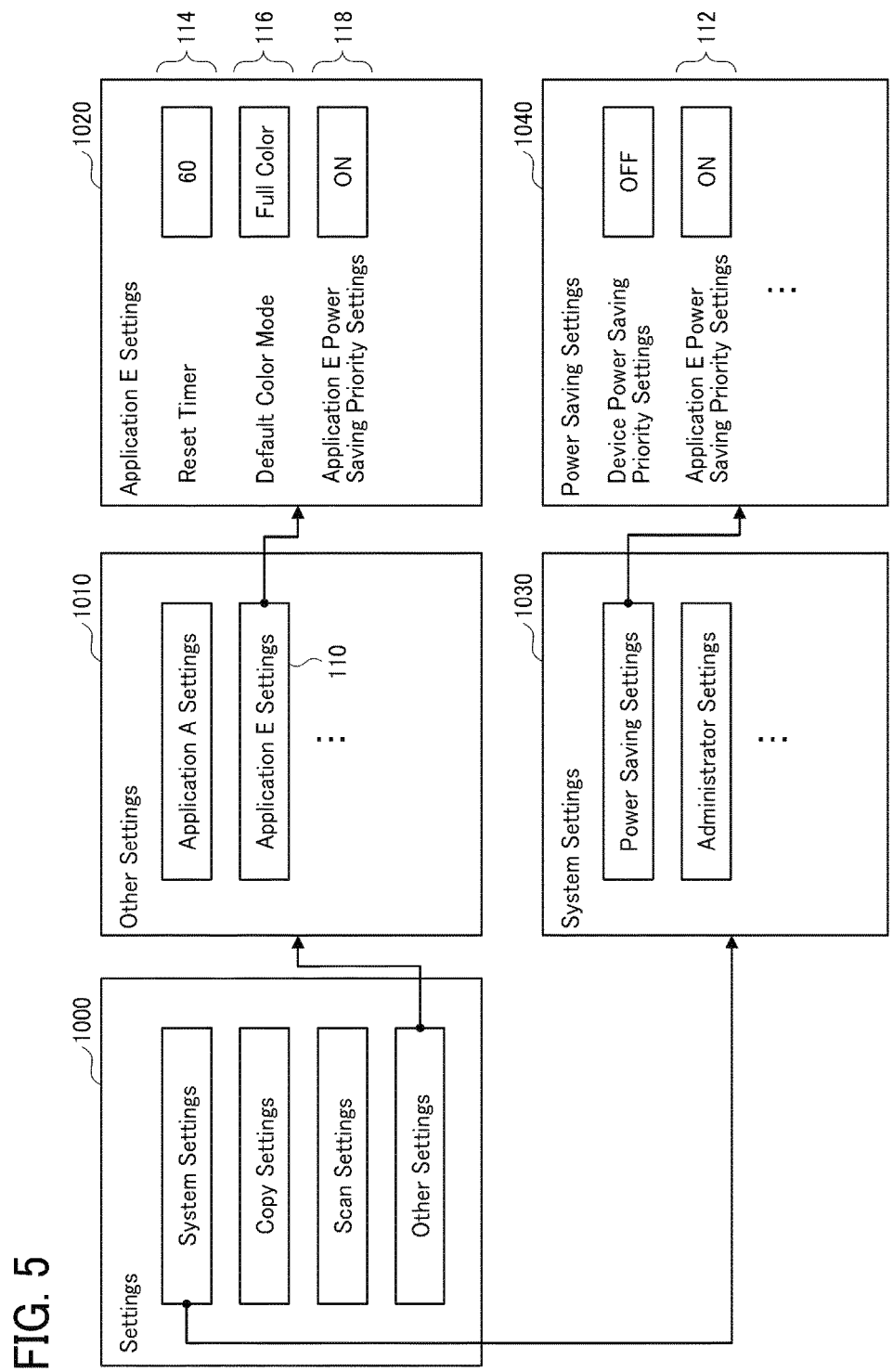
FIG. 5 is an illustration of a screen transition of setting screen generated by a system program, according to an embodiment of the present disclosure.

In the example of the setting values and setting information of FIG. 3 and the setting configuration of FIG. 4, the system program 14 generates and displays a setting screen that transitions as illustrated in FIG. 5, for example. FIG. 5 is an illustration of a screen transition of setting screen generated by the system program 14. For example, a setting screen 1030 corresponding to the configuration of "system settings" of FIG. 4 displays buttons corresponding to each of the configuration of "power saving settings" and the configuration of "administrator settings", which are "children" of the configuration of "system settings". When the "power saving settings" button is selected, a setting screen 1040 corresponding to the configuration of "power saving settings" of FIG. 4 is displayed. The setting screen 1040 displays setting content corresponding to each of the content of "B002" and the content of "E003", which are "children" of the configuration of "power saving settings". On the setting screens 1000 and 1030 illustrated in FIG. 5, the configurations and the content associated with the additional application 12E are not added.

On the setting screen 1010 illustrated in FIG. 5, the configuration 110 associated with the additional application 12E is added. On the setting screen 1020 illustrated in FIG. 5, the pieces of content 114, 116, and 118 associated with the additional application 12E are added. On the setting screen 1040 illustrated in FIG. 5, the piece of content 112 associated with the additional application 12E is added.

As described above, in the image forming apparatus 1 according to the present embodiment, the installed additional application 12E writes, in the setting value storage unit 16, the setting values and setting information associated with the additional application 12E. The setting values and setting information, which are written in the setting value storage unit 16 by the installed additional application 12E are the information, as illustrated in FIG. 3, required to generate and display the setting screens.

The system program 14 that provides the setting function reads out the setting values and setting information written in the setting value storage unit 16 to generate and display the setting screens 1000, 1010, 1020, 1030, and 1040 of the existing applications 12A to 12C and the additional application 12E. According to the present embodiment, the setting function of the additional application 12E can be added to the setting function of the existing applications 12A to 12C without changing the system program 14.

Operation

Figure 6B:
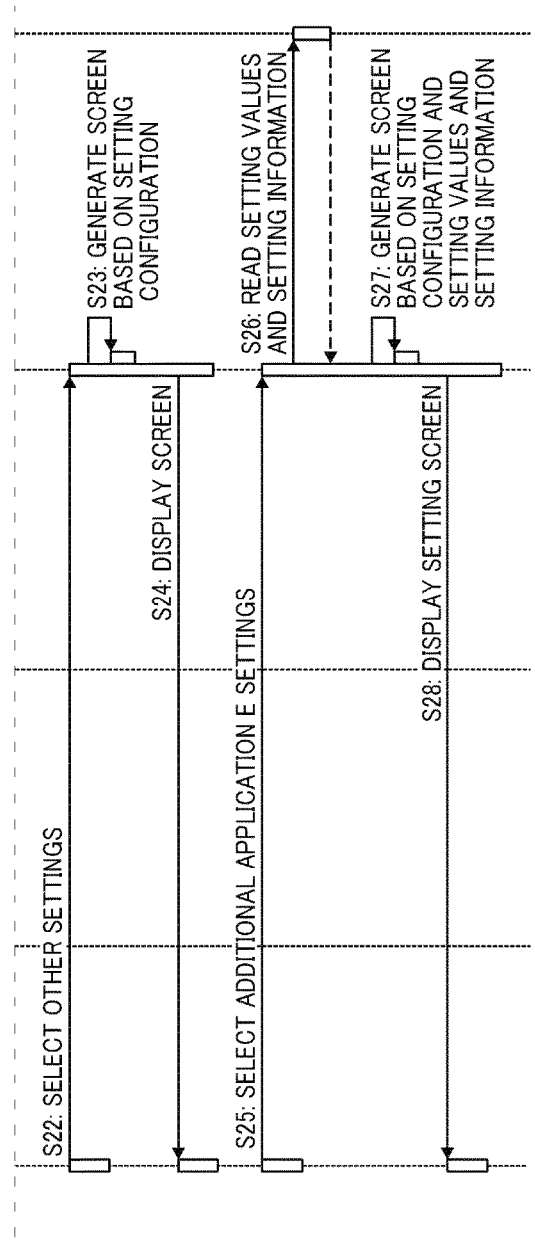

A detailed description is now given of operation of the image forming apparatus 1 according to the present embodiment. FIG. 6A and FIG. 6B (FIG. 6) are a sequence diagram illustrating an example of a process in which an additional application is installed on the image forming apparatus 1 and then a setting screen is displayed by the setting function.

In S11, the installer 10 receives an operation of installing the additional application 12E from a user. In S12, the installer 10 installs the application 12E. In S13, the installer 10 notifies the system program 14 of the installation of the application 12E.

In S14, the system program 14 transmits a request to the application 12E to store setting values. Hereinafter, the request is also referred to as a setting value storage request. In S15, upon receiving the setting value storage request from the system program 14, the application 12E writes the setting values and setting information associated with the application 12E into the setting value storage unit 16.

For example, in the example of FIG. 3, the setting values and setting information 100 associated with the existing applications 12A to 12C are stored in the setting value storage unit 16, in advance, and the setting values and the setting information 102 associated with the additional application 12E are added by the processing of S15. In S16, the application 12E reports to the system program 14 that the setting values and setting information 102 associated with the additional application 12E has been stored, in response to the setting value storage request. This notification is also referred to as a setting value storage response.

In S17, the system program 14 receives an operation for activating the setting function from the user. In S18, the system program 14 reads the setting values and setting information associated with the applications 12 stored in the setting value storage unit 16 illustrated in FIG. 3. In S19, the system program 14 combines the setting configuration of the existing applications 12A to 12C with the setting configuration of the additional application 12E. For example, in the example of FIG. 4, the configuration 110 and the pieces of content 114, 116, and 118 are added to the setting configuration.

Figure 7B:
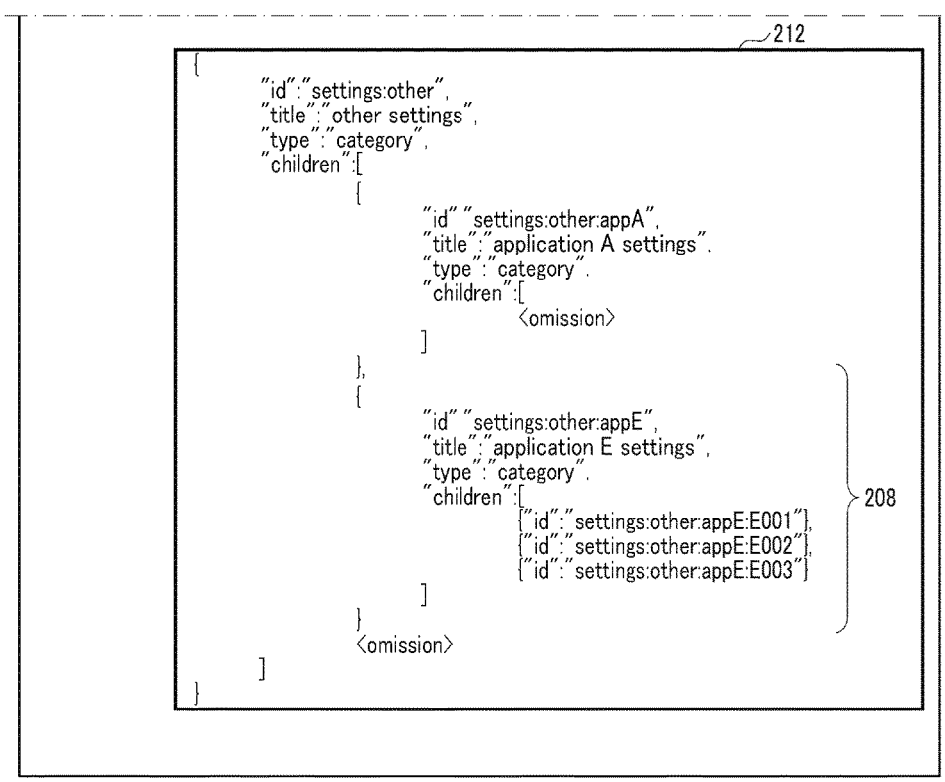

By the processing of S19, the setting configuration described by, for example, JSON retained by the system program 14 is updated as one illustrated in FIG. 7 (FIG. 7A and FIG. 7B). FIG. 7 (FIG. 7A and FIG. 7B) is a diagram of an example of data describing a setting configuration.

The JSON is a collection of pairs of a name (Key) and a value (Value). A configuration enclosed by "{ }" is referred to as an object, and a configuration enclosed by "[ ]" is referred to as an array. For example, in a case of ""id":" settings:system:eco" of an object 200 in FIG. 7A, "id" is a name (Key) and "settings:system:eco" is a value (Value).

In addition, the object 200 defines a power setting screen (configuration). The "children" of the object 200 has a value that is an array defining two pieces of setting content (content). Accordingly, an object 204 and an object 206, each of which has an array configuration, are described as the value of "children" of the object 200. Namely, each of the object 204 and the object 206 represent as a "child" of the object 200. In addition, an object 208 defines an application E setting screen (configuration), and a value of "children" of the object 208 is an array defining three pieces of setting content (content). In addition, dependency of a plurality of objects indicates how the screen transitions among screens each of which is defined by the corresponding one of the plurality of objects. For example, the object 200 is described as a value of "child" of the object 210. This indicates that a screen defined by the object 210 can transition to a screen defined by the object 200.

In addition, in the item of "location" of the setting value and setting information illustrated in FIG. 3, in a case of the object 200 illustrated in FIG. 7A, a value of "settings: system:eco" of "id:" settings:system:eco", is stored. In the example of FIG. 7 (FIG. 7A and FIG. 7B), the object 200 having "type":"category" is "configuration", and the object 204 and the object 206, which are without "type":"category", are "content". In the example of FIG. 7 (FIG. 7A and FIG. 7B), the pieces of "content" are arranged in ascending order of the IDs. A detail of the setting content is stored in the corresponding record of the setting value and setting information illustrated in FIG. 3. As described above, the dependency of among setting screens (screen transition relation) is defined as the setting configuration as illustrated in FIG. 7 (FIG. 7A and FIG. 7B).

Returning to S20 in FIG. 6A, the system program 14 generates, for example, the setting screen 1000 based on the setting configuration, which is combined in S19, as illustrated in FIG. 7 (FIG. 7A and FIG. 7B). In S21, the system program 14 displays the setting screen 1000.

When "Other settings" is selected on the setting screen 1000 in S22, the process proceeds to S23, and the system program 14 generates, for example, the setting screen 1010 based on the setting configuration as illustrated in FIG. 7 (FIG. 7A and FIG. 7B), which is combined in S19, for example. In S24, the system program 14 displays the setting screen 1010.

When "application E settings" is selected on the setting screen 1010 in S25, the process proceeds to S26, and the system program 14 reads out the information required to generate and display the setting screen 1020 from the setting value storage unit 16. In S27, the system program 14 generates, for example, the setting screen 1020 based on the setting configuration as illustrated in FIG. 7 (FIG. 7A and FIG. 7B), which is combined in S19 and the setting values and setting information read out in S26. In S28, the system program 14 displays the setting screen 1020.

As illustrated in the sequence diagram illustrated in FIG. 6A and FIG. 6B (FIG. 6), the system program 14 sets the value of "children" to a rendering target. That is, in the present embodiment, the value of "children" or "child" of "child" is not a rendering target. For example, when generating the setting screen 1000, the system program 14 sets "system settings", "copy settings", "scan settings", and "other settings" described as the value of "children" of the object of the setting screen 1000 to rendering targets. In addition, "power saving settings" and "administrator settings" described as the value of "children" of the object of the setting screen 1030 are rendering targets.

As described above, the sequence diagram illustrated in FIG. 6A and FIG. 6B (FIG. 6) illustrates the example of the process of sequentially generating the selected setting screens, however all the setting screens may be generated at once. Further, in addition to the JSON, the setting configuration illustrated in FIG. 7 (FIG. 7A and FIG. 7B) may define the setting screens using another format such as an eXtensible Markup Language (XML) or a HyperText Markup Language (HTML).

Figure 8:
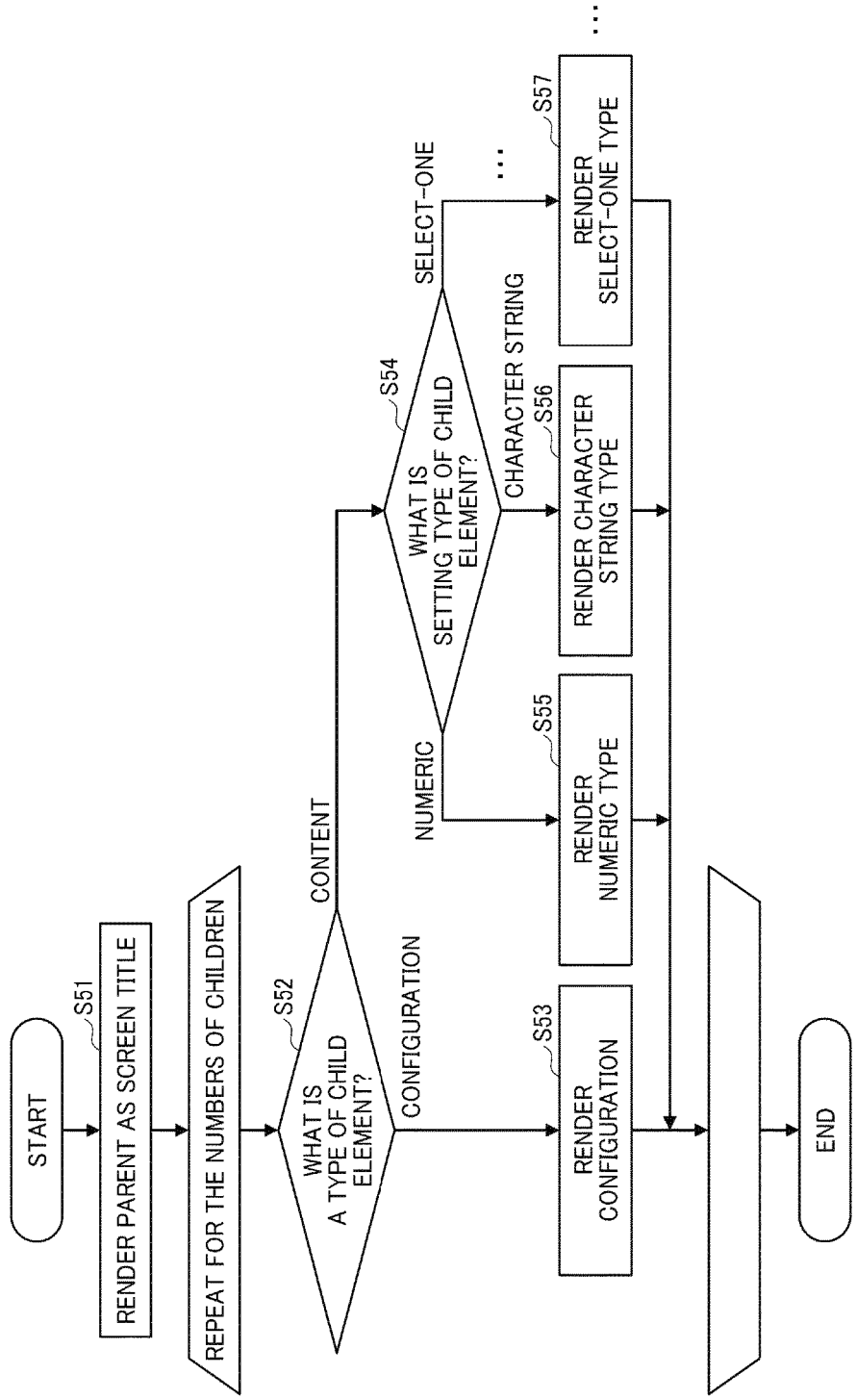
FIG. 8 is a flowchart illustrating an example of a screen rendering process, according to an embodiment of the present disclosure.

Each setting screen generated in S20, S23 and S27 follows steps of a flowchart illustrated in FIG. 8, for example. FIG. 8 is a flowchart illustrating an example of a process of rendering a screen (screen rendering process). In the screen rendering process illustrated in FIG. 8, a setting screen is rendered using the rendering template illustrated in FIG. 9 and the screen template illustrated in FIG. 10, which are stored in the template storage unit 18.

Figure 10:
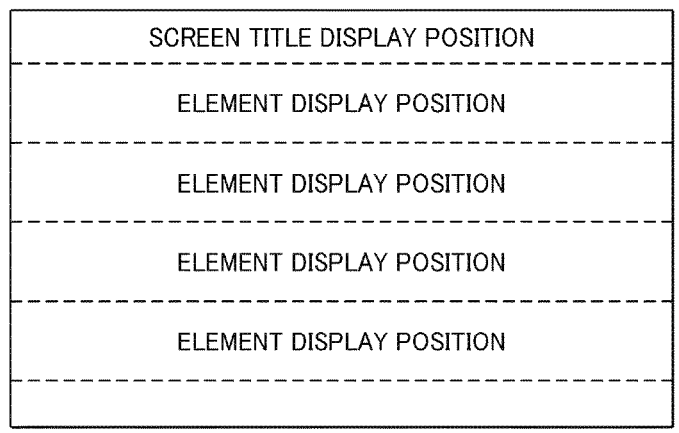
FIG. 10 is an illustration of a screen template, according to an embodiment of the present disclosure.

In S51, the system program 14 renders the value of "title" of "parent" in the "screen title display position" of the screen template illustrated in FIG. 10. The processing of S52 to S57 is repeated by the number of "children".

In S52, the system program 14 determines whether a type of a "child" element (object) is "configuration" or "content". If the type of the "child" element is "configuration", the process performed by the system program 14 proceeds to S53 and renders the rendering template, of which the type of the element is "configuration", illustrated in FIG. 9, on the screen template illustrated in FIG. 10.

On the other hand, if the type of the "child" element is not "configuration", but "content", the process proceeds to S54, and the system program 14 determines the setting type of the "child" element. If the setting type of the "child" element is the "numeric type", the process proceeds to S55 and the system program 14 renders a rendering template corresponding to the element type of "content" and the setting type of "numeric type", on the screen template illustrated in FIG. 10.

If the setting type of the "child" element is the "character string type", the process proceeds to S56 and the system program 14 renders a rendering template corresponding to the element type of "content" and the setting type of "character string type", on the screen template illustrated in FIG. 10. If the setting type of the "child" element is the "select-one type", the process proceeds to S57 and the system program 14 renders a rendering template corresponding to the element type of "content" and the setting type of "select-one type", on the screen template illustrated in FIG. 10.

Figure 11B:
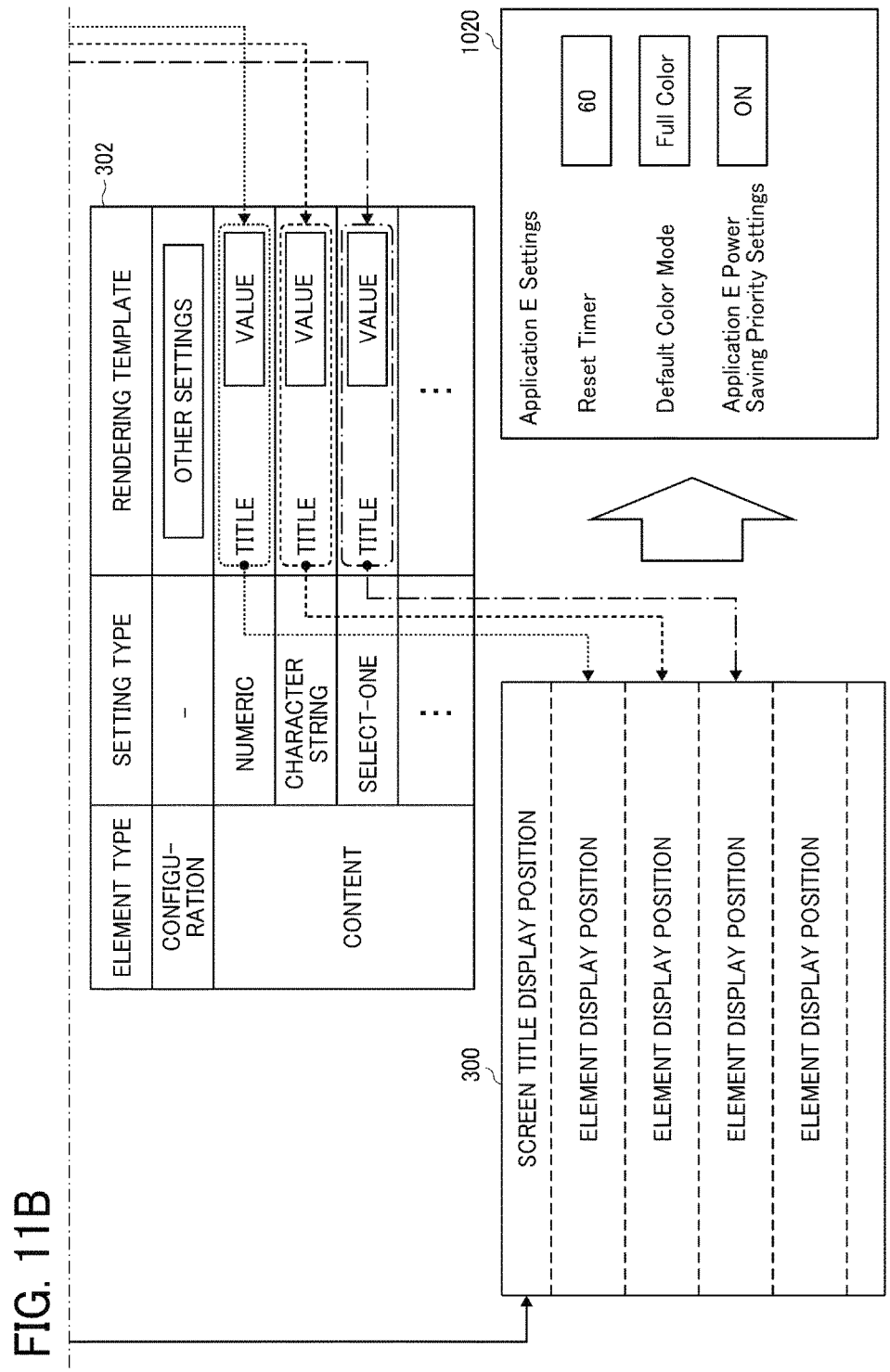

A specific example of the screen rendering process illustrated in FIG. 8 is performed as illustrated in FIG. 11A and FIG. 11B (FIG. 11), for example. FIG. 11 (FIG. 11A and FIG. 11B) is a diagram illustrating an example of the screen rendering process. The diagram of FIG. 11 (FIG. 11A and FIG. 11B) illustrates the process of rendering the setting screen 1020 based on the object 208 illustrated in FIG. 7B.

The system program 14 renders the value of "application E settings" of the "title" of the "parent" of the setting configuration 304 in the "screen title display position" of the screen template 300. In addition, the system program 14 sequentially reads "child" elements of the setting configuration 304. The system program 14 renders the rendering template 302 corresponding to the setting type of each read "child" element on the screen template.

For example, the system program 14 reads the rendering template of the setting type of "numeric type" corresponding to the setting type of the "child" element having the ID of "E001" and renders the read template on the screen template 300. That is, the setting content of "reset timer" of the setting screen 1020 is rendered, accordingly. In addition, the system program 14 reads the rendering template of the setting type of "select-one type" corresponding to the setting type of the "child" element having the ID of "E002" and renders the read template on the screen template 300. That is, the setting content of "default color mode" of the setting screen 1020 is rendered, accordingly. In addition, the system program 14 reads the rendering template of the setting type of "select-one type" corresponding to the setting type of the "child" element having the ID of "E003" and renders the read template on the screen template 300. That is, the setting content of "application E power saving priority settings" of the setting screen 1020 is rendered, accordingly.

As a result, the system program 14 can generate the setting screen 1020 of the additional application 12E without changing the system program 14, and display the setting screen 1020 on a web browser or the like installed on the image forming apparatus 1.

A specific example of a screen rendering process for the setting screen 1010 is performed as follows, based on the object 212 illustrated in FIG. 7B, for example.

The system program 14 renders the value of "title" that is "other settings" in the "screen title display position" of the screen template. In addition, the system program 14 sequentially reads out the "child" elements and renders the rendering template corresponding to the setting type of each "child" element on the screen template.

For example, the system program 14 determines that the element type of the "child" element of "application A settings" is "configuration" (S52) and renders the rendering template corresponding to the element type of "configuration" on the screen template illustrated in FIG. 10 (S53), namely, renders an "application A settings" button of the setting screen 1010. Subsequently, the system program 14 determines that the element type of the next "child" element of "application E settings" is "configuration" (S52) and renders the rendering template corresponding to the element type of "configuration" on the screen template illustrated in FIG. 10 (S53), namely, renders an "application E settings" button of the setting screen 1010.

As a result, the system program 14 can generate the setting screen 1010 including a button for displaying the setting screen 1020 for setting the additional application 12E without changing the system program 14, and can display the setting screen 1010 on a web browser or the like installed on the image forming apparatus 1. The web browser is an example of a program having a display function.

Variations

Figure 12:
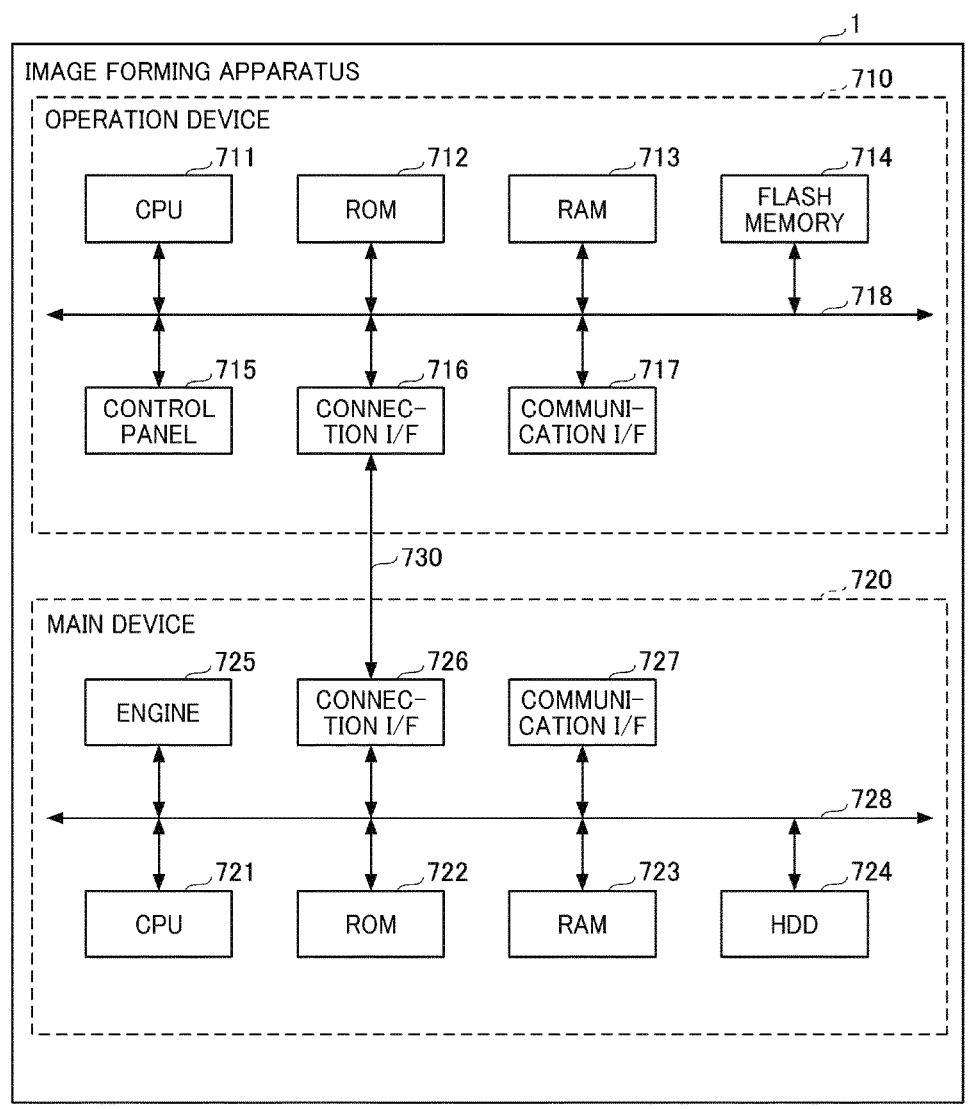
FIG. 12 is a block diagram illustrating an example of a hardware configuration of an image forming apparatus including an operation device and a main device, according to an embodiment of the present disclosure.

For example, the image forming apparatus 1 illustrated in FIG. 1 may include a plurality of devices, such as a device that serves as an operation device and a device that serves as a main device. FIG. 12 is a block diagram illustrating an example of a hardware configuration of an operation device 710 and a main device 720 included in the image forming apparatus 1.

As illustrated in FIG. 12, the operation device 710 includes a CPU 711, a ROM 712, a RAM 713, a flash memory 714, a control panel 715, a connection interface (I/F) 716, and a communication I/F 717, and the above-mentioned hardware elements are connected to each other through a bus 718.

The CPU 711 executes various types of programs stored in the ROM 712 or the flash memory 714 using the RAM 713 as a work area to control the overall operation of the operation device 710 and to implement each of the function. The flash memory 714 is a nonvolatile storage medium, and stores various programs executed by the CPU 711 and various data.

The control panel 715 has a display/operation unit and a hardware key for allowing a user to perform various operations. The display/operation unit of the control panel 715 can further display an internal state of the image forming apparatus 1. The connection I/F 716 is an interface to communicate with the main device 720 through a communication path 730. Here, a USB standard interface is used as an example of the connection I/F 716. The communication I/F 717 is an interface for communicating via a network.

The main device 720 includes a CPU 721, a ROM 722, a RAM 723, an HDD 724, an engine 725, a connection I/F 726, and a communication I/F 727, and the above-mentioned hardware elements are connected to each other through a bus 728.

The CPU 721 executes various types of programs stored in the ROM 722 or the HDD 724 using the RAM 723 as a work area to control the overall operation of the main device 720 and to implement each of the function. The HDD 724 is a nonvolatile storage medium, and stores various programs executed by the CPU 721 and various data.

The engine 725 is hardware for performing information processing for implementing image processing functions such as a copy function, a scan function, a facsimile communication function, a print function, and the like. The engine 725 includes, for example, a scanner that scans and reads a document, a plotter that performs printing on a sheet material such as paper, and a communication device that performs facsimile communication. The engine 725 may further include a finisher that sorts printed sheet materials and an automatic document feeder (ADF) that automatically feeds documents. The connection I/F 726 is an interface to communicate with the operation device 710 through the communication path 730. Here, a USB standard interface is used as an example of the connection I/F 726. The communication I/F 727 is an interface for communicating via a network.

Figure 13:
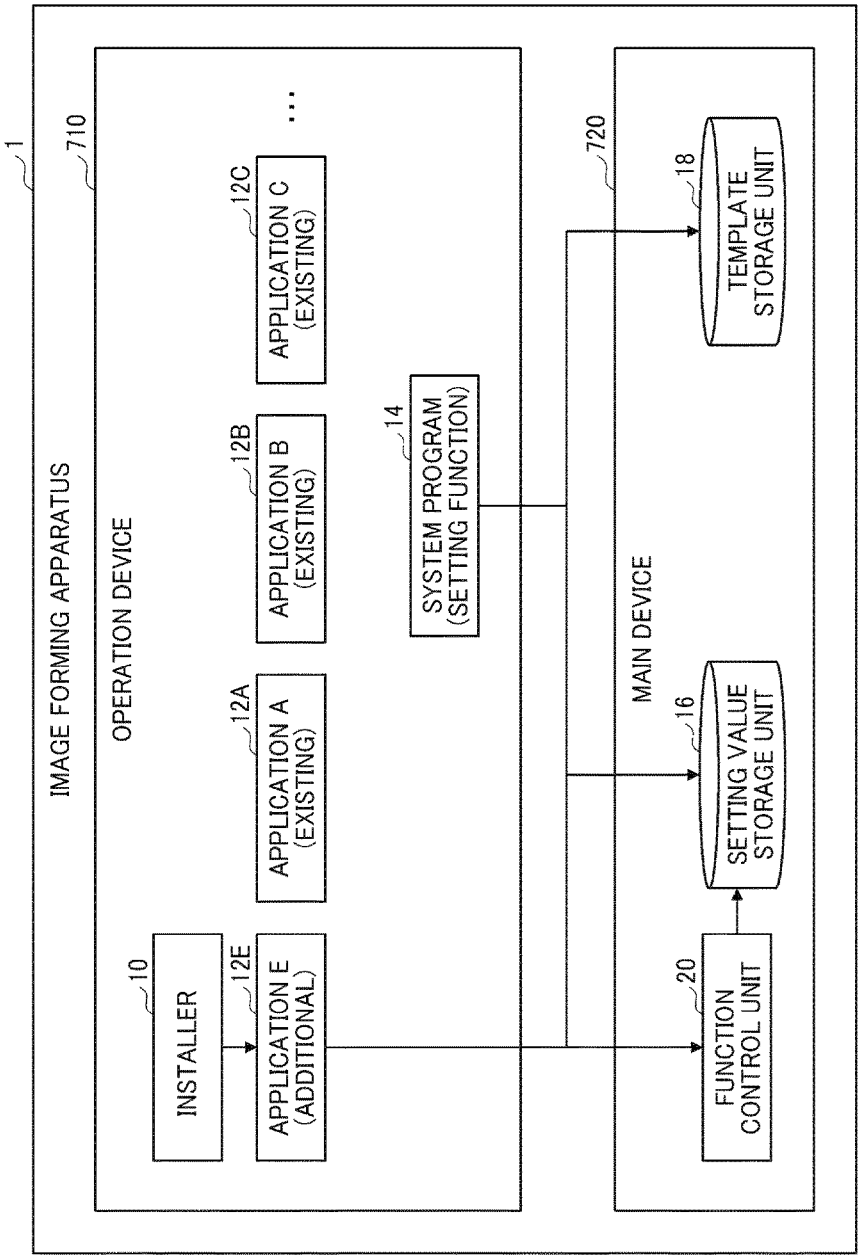
FIG. 13 is a block diagram illustrating another example of a functional configuration of an image forming apparatus, according to an embodiment of the present disclosure.

A description is now given of a functional configuration of the image forming apparatus 1 having the hardware configuration in which the operation device 710 and the main device 720 are separately provided as illustrated in FIG. 12. FIG. 13 is a block diagram illustrating another example of the functional configuration of the image forming apparatus 1 according to the present embodiment. The functional configuration of the image forming apparatus 1 may include other functional unit in addition to the functional units illustrated in FIG. 13.

The operation device 710 of the image forming apparatus 1 illustrated in FIG. 13 includes the installer 10, the existing applications 12A to 12C, the additional application 12E, and the system program 14 having a setting function. In addition, the main device 720 of the image forming apparatus 1 illustrated in FIG. 13 includes the setting value storage unit 16, the template storage unit 18, and the function control unit 20. The installer 10, the existing applications 12A to 12C, the additional application 12E, the system program 14 having the setting function, the setting value storage unit 16, the template storage unit 18, and the function control unit 20 are the same as those in FIG. 2, and a description thereof is omitted in the following.

In addition, the installer 10, the existing applications 12A to 12C, the additional application 12E, the system program 14 having the setting function, the setting value storage unit 16, and the template storage unit 18, namely the elements other than the function control unit 20, may be included in any one of the operation device 710 and the main device 720.

As described above, according to the present embodiment, it is possible to easily add the settings of the additional application 12E to the setting screen for transitioning the screen of the existing applications 12A to 12C.

Numerous additional modifications and variations are possible in light of the above teachings. For example, elements and/or features of different illustrative embodiments may be combined with each other and/or substituted for each other within the scope of this disclosure and appended claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. For example, the setting receiving unit, the storage unit, the installation unit, the addition unit, and the setting receiving unit may be implemented by processing circuitry, which may operate in cooperation with hardware of any desired apparatus, such as the image forming apparatus as described above.

This patent application is based on and claims priority pursuant to 35 U.S.C. § 119(a) to Japanese Patent Application No. 2018-049977, filed on Mar. 16, 2018, in the Japan Patent Office, the entire disclosure of which is hereby incorporated by reference herein.

REFERENCE SIGNS LIST

1 Image forming apparatus
10 Installer
12A-12C Existing application
12E Additional application
14 System program
16 Setting value storage unit
18 Template storage unit
20 Function providing unit
100 Setting values and setting information corresponding to existing applications
102 Setting values and setting information corresponding to an additional application
110 Configuration
112-118 Content
200, 204, 206, 208 Object
300 Screen template
302 Rendering template
304 Setting configuration
710 Operation device
720 Main device
1000, 1010, 1020, 1030, 1040 Setting screen

The invention claimed is:

1. An image forming apparatus installed with at least one first application, the image forming apparatus comprising:
processing circuitry configured to:
display, using a program, a plurality of first setting screens for setting the at least one first application and to receive a first input of a first setting value of the at least one first application,
store first information to display the plurality of first setting screens for setting the first application,
install a second application on the image forming apparatus, and add, in response to installation of the second application, second information used for displaying at least one second setting screen for setting the second application to a memory without changing the system program, the second information including location information indicating a location of the at least one second setting screen in a screen transition among the plurality of first setting screens, wherein the processing circuitry is further configured to, using the system program control the screen transition among the plurality of first setting screens and the at least one second setting screen to be displayed, based on the location information of the second information added to the memory, the second setting screen to be used for receiving a second input of a second setting value corresponding to the second application, the system program provides a setting function which reads setting information from the memory to generate and display the plurality of first setting screens and the at least one second setting screen, wherein the adding second information used for displaying at least one second setting screen for setting the second application to a memory includes setting a plurality of locations for a single setting value and setting information.

2. The image forming apparatus of claim 1, wherein,
the at least one second setting screen includes a plurality of second setting screens,
the location information added indicates a plurality of locations each of which corresponds to one of the plurality of second setting screens, and
the processing circuitry is further configured to display the plurality of first setting screens and the plurality of second setting screens, such that each of the plurality of second setting screens is in the corresponding location in the screen transition based on the location information.

3. The image forming apparatus of claim 1, wherein,
the second information added to the memory further includes display setting content information indicating setting content to be displayed on the second setting screen, and
the processing circuitry is further configured to display, in the second setting screen, display setting content indicated by the display setting content information.

4. The image forming apparatus of claim 1, wherein,
each of the first information and the second information has a parent-child relationship including elements each of which has one of a configuration type and a content type, and
based on one of the configuration type and the content type, the processing circuitry is further configured to selectively display a selection screen or at least one of the first setting screen and the second setting screen, the selection screen being used for receiving an input of selecting one of the first setting screen and the second setting screen.

5. The image forming apparatus of claim 4, wherein,
the processing circuitry is further configured to use 1) a screen template indicating a screen position of each element and 2) a rendering template for the element of the configuration type and each element of a setting type of content type and indicating a position of each element, to selectively display at least one of the first setting screen and the second setting screen, or the selection screen.

6. The image forming apparatus of claim 1, wherein the adding second information used for displaying at least one second setting screen for setting the second application to a memory includes combining a setting configuration of the second application with a setting configuration of the at least one first application.

7. The image forming apparatus of claim 1, wherein the second setting screen includes a third setting screen for receiving the second input of the second setting value corresponding to the second application.

8. A method of controlling display, performed by an image forming apparatus installed with at least one first application, the method comprising:
storing, in a memory, first information used to display, using a system program a plurality of first setting screens for setting the first application, the first setting screen to be used for receiving a first input of a first setting value of the first application;
installing a second application on the image forming apparatus;
in response to installation of the second application, adding second information used for displaying at least one second setting screen for setting the second application to the memory without modifying the system program, the second information including location information indicating a location of the at least one second setting screen in a screen transition among the plurality of first setting screens; and
controlling, using the system program, the screen transition among the plurality of first setting screens and the at least one second setting screen to be displayed, based on the location information of the second information added to the memory, the second setting screen to be used for receiving a second input of a second setting value corresponding to the second application,
wherein the system program provides a setting function which reads setting information from the memory to generate and display the plurality of first setting screens and the at least one second setting screen,
wherein the adding second information used for displaying at least one second setting screen for setting the second application to a memory includes setting a plurality of locations for a single setting value and setting information.

9. A non-transitory recording medium storing computer-readable code for controlling a computer system to carry out the method of claim 8.

10. The method of claim 8, wherein,
the at least one second setting screen includes a plurality of second setting screens,
the location information added by the adding operation indicates a plurality of locations each of which corresponds to one of the plurality of second setting screens, the method further comprising:
displaying the plurality of first setting screens and the plurality of second setting screens, such that each of the plurality of second setting screens is located in the corresponding location in the screen transition based on the location information.

11. The method of claim 8, wherein,
the second information added to the memory further includes display setting content information indicating setting content to be displayed on the second setting screen, and
the operation of displaying displays, in the second setting screen, display setting content indicated by the display setting content information.

12. The method of claim 8, wherein,
each of the first information and the second information has a parent-child relationship including elements each of which has one of a configuration type and a content type, and
based on one of the configuration type and the content type, the operation of displaying selectively displays a selection screen or at least one of the first setting screen and the second setting screen, the selection screen being used for receiving an input of selecting one of the first setting screen and the second setting screen.

13. The method of claim 12, wherein,
the operation of displaying uses 1) a screen template indicating a screen position of each element and 2) a rendering template provided for the element of the configuration type and each element of a setting type of content type and indicating a position of each element, to selectively display at least one of the first setting screen and the second setting screen, or the selection screen.

14. The method of claim 8, wherein the adding second information used for displaying at least one second setting screen for setting the second application to a memory includes combining a setting configuration of the second application with a setting configuration of the at least one first application.

15. The method of claim 8, wherein the second setting screen includes a third setting screen for receiving the second input of the second setting value corresponding to the second application.

* * * * *